United States Patent Office 3,231,636
Patented Jan. 25, 1966

3,231,636
HIGH SHEAR STRENGTH BLENDS OF HIGH AND LOW DENSITY POLYETHYLENE
John A. Snyder, Plainfield, and Harold C. Vakos, Metuchen, N.J., assignors to Union Carbide Corporation, a corporation of New York
No Drawing. Filed Mar. 20, 1958, Ser. No. 722,633
5 Claims. (Cl. 260—897)

This invention relates to polyethylene blends and more particularly to polyethylene blends exhibiting improved physical characteristics.

Polyethylene resins are superior to other thermoplastic resins in providing a combination of qualities such as water and chemical resistance, low temperature flexibility and dielectric properties and are therefore the most suitable materials for many applications, such as wire insulation and cable jackets. The degree of mechanical strength possessed by the polyethylene resins is of paramount importance in these applications. Increased toughness and greater resistance to abrasion and cutting, conveniently measured by an increased "shear strength" for the resin, are therefore highly desirable.

The mechanical strength of polyethylene resins is commonly severely reduced by continued exposure to elevated temperatures. This deleterious effect, termed "thermal embrittlement," is manifested by a loss in flexibility and by cracking under stress. It is particularly detrimental to wire insulation and similar applications where elevated temperatures are normally encountered during service life.

It is known that polyethylene resins having specific gravities of 0.945 or more possess significantly greater shear strength than ordinary commercial polyethylene resins which have specific gravities of about 0.928 to 0.918. These higher specific gravity resins, however, are highly prone to failure under stress because of thermal embrittlement and are therefore unsuitable for many electrical applications. The incorporation of an amount of rubber in the resin has been employed heretofore to prevent thermal embrittlement. The addition of rubber, however, provides only a negligible improvement in embrittlement characteristics and adversely affects other physical properties of the resin such as light stability and rigidity. Improvement in either the thermal embrittlement characteristics or the shear strength of a polyethylene resin can be effected by modifying the molecular weight and/or the specific gravity thereof during polymerization. Any simultaneous improvement, however, in shear strength and thermal embrittlement resistance which is obtained by modyifying polymerization techniques, generally results in lower production rates, higher manufacturing costs and a sacrifice of extrudability and moldability characteristics.

It is the principal object of the present invention therefore to provide a polyethylene composition which possesses improved shear strength and increased resistance to thermal embrittlement.

These and other objects we have found are accomplished by mixing about 50 to 85 parts by weight of a polyethylene resin having a specific gravity above 0.945 and a melt index of from 0.02 to 8.0 with about 50 to 15 parts by weight of resin having a specific gravity between 0.925 and 0.915 and a melt index of from 0.02 to 25.0 to form 100 parts by weight of a resin blend having a specific gravity ranging between about 0.930 and 0.960 and a melt index of from 0.02 to 5.0.

The polyethylene blend composition described above provides an unexpected and synergistic effect in securing a shear strength and thermal embrittlement resistance which are far superior to a single resin directly polymerized to the same specific gravity and melt index. This result is even more surprising in view of the fact that virtually all other physical and electrical properties of the the resin blend are the average of the component resins of the blend. A blend typical of our invention and a directly polymerized single resin were tested and the results are summarized in Table I.

Table I

|  | 1 | 2 |
|---|---|---|
| Resin (parts by weight): |  |  |
| "A" Sp. gr. 0.963; M.I. 0.6 | 70 |  |
| "B" Sp. gr. 0.920; M.I. 0.5 | 30 |  |
| Single resin |  | 100 |
| Properties:[1] |  |  |
| Sp. gr. 23° C./23° C. | 0.950 | 0.950 |
| Melt index, dg./min. | 0.5 | 0.5 |
| Tensile strength (p.s.i.) | 3,200 | 3,300 |
| Yield strength (p.s.i.) | 2,950 | 2,950 |
| Ultimate elongation (percent) | 50 | 50 |
| Hardness, Durometer "D" | 59 | 59 |
| Dielectric constant at 50 mc. | 2.35 | 2.34 |
| Brittle temperature,[2] (° C.) | −95 | −95 |
| Shear strength (p.s.i.) | 3,300 | 2,700 |
| Thermal embrittlement at 70° C. (weeks to initial failure) | 22 | 16 |

[1] All test specimens prepared by Procedure 1 described below.
[2] Indicates temperature at which 80% of specimens tested passed.

It will be noted that the polyethylene blend for all practical purposes is equivalent to the single resin in each of the properties with the exception of shear strength and thermal embrittlement which are substantially and unexpectedly improved.

The advantages of the present invention are not limited to improvement over specially polymerized single resins. Blend compositions hereinbelow described in greater detail provide, in addition to increased strength, hardness and stiffness etc. which could possibly be expected from the make-up of the blend, a degree of shear strength and resistance to thermal embrittlement which exceeds that of either of the components. Thus we have discovered that a synergistic effect is obtained when the lower specific gravity resin, which possesses excellent thermal embrittlement resistance, is blended with a higher specific gravity resin, which possesses great shear strength, to provide a blend having greater resistance to thermal embrittlement than the lower specific gravity component, and greater shear strength than the higher specific gravity component.

We prefer, for greatest improvement in both shear strength and resistance to thermal embrittlement, to employ between about 60 to 85 parts by weight of a polyethylene resin having a specific gravity of at least 0.955 and a melt index of 0.05 to 3.0 mixed with 40 to 15 parts by weight of a polyethylene resin having a specific gravity of between about 0.917 and 0.923 and a melt index of 0.05 to 5.0 to give a blend composition having a specific gravity of 0.940 to 0.958 and a melt index of 0.05 to 2.5. Even more to be preferred is the use of a lower specific gravity resin having a melt index between 0.05 and 3.0 and a blend composition which has a melt index between 0.1 and 1.5.

Blend compositions having a melt index above about 2.5 while improved with respect to resistance to thermal embrittlement have less than the desired degree of shear strength. Compositions having a melt index above 5 are even further reduced in strength.

The novel polyethylene resin blends of our invention can be prepared by any of the procedures ordinarily used to mix and compound polyethylene resin compositions. For example, the components can be mixed or blended together in a ribbon blender, differential-speed roll mill, Hobart mixer, paddle blender or the like. It is critical to conduct at least a portion of the mixing at a temperature high enough to flux the polyethylene resins, in order to achieve an adequate uniformity of product. The hot mixing can be satisfactorily performed in a Banbury mixer or rubber mill and the like. It has also been found practicable to combine the mixing and compounding operation with the forming operation by use of a compounding extruder. The blend can be made by metered pumping of one fluxed component into another fluxed component prior to or after emission of the latter from a polymerization reactor or production line.

As with other polyethylene compositions the blends of our invention can contain antioxidants, stabilizers, slip and anti-blocking agents, lubricants, colorants, fillers and modifiers. It is preferred to employ an antioxidant such as a hindered phenol or thiobisphenol to minimize degradation of the resin blend during processing.

The following examples are illustrative of the invention.

EXAMPLES

In Table II following, the results of tests for dielectric constant and shear strength for each of the compositions therein shown, are given. Test results for the yield strength or the hardness of the compositions are also presented. The control compositions 1 and 3 give the physical and electrical property data for the higher specific gravity resins. Control compositions 2 and 4 give same data for the lower specific gravity resins. The "A" resin is the higher specific gravity resin and the "B" resin is the lower specific gravity resin. Examples 1, 2, 4 and 5 are blends typical of the present invention. Examples 3 and 6 are given to show effects on shear strength of too high a concentration of lower specific gravity resin.

The compositions of the examples were prepared by one of the following procedures.

(1) 30 pounds of the mixture indicated in the tables and .015 pound of 4,4-thiobis(6-tert-butyl-meta-cresol) as a stabilizer were blended and fluxed in a Banbury mixer fo 10 minutes under a ram pressure of 45–80 p.s.i. Cold water was circulated through the Banbury mixer jacket to maintain the temperature of the plastic mass between 130–170° C. (The fluxing characteristics of the individual blend composition determined the specific temperature used.) The hot plastic mass was then sheeted on an equal speed, two-roll mill heated to about 110–130° C. (Specific temperature was dependent again on the individual composition.) After seven passes through the bight of the mill, the rolled sheet, approximately 1/8" thick, was removed from the mill. Several sections 8" on a side were cut from the sheet and compression molded to form panels 8" on a side and 0.075" thick which were set aside for testing.

The remaining material was cooled and granulated and thereafter extruded at 100–110 ft./min. onto #14 AWG copper wire preheated to 95–120° C. The extruder was a Royal #1, two-inch diameter, wire coating extruder fitted with a 0.128" diameter wire coating die. The temperature of the blend composition at the die lip was 192–208° C. The coated wire was cooled by air for a distance of 6 ft. and then by a 15 ft. water bath. The bath temperature ranged from 25° C. to 75° C. depending on the relative concentrations of the lower and higher specific gravity components in the blend.

(2) 25 pounds of the indicated mixture and essentially .0125 pound of 4,4'-thiobis(6-tert-butyl-meta-cresol) were mixed, fluxed in the barrel of a compounding extruder and then extruded into 1/8" diameter strands. The feed section of the compounder-extruder was maintained at a temperature of 50° C. This temperature was progressively increased along the barrel of the compounder-extruder with the extruder head being maintained at 190–210° C. and the die lips at 190–200° C. The rate of extrusion was 1 lb./min. The strands were pelletized and a portion of the pelletized material was fluxed and sheeted on a two-roll mill and thereafter formed into panels as described in procedure (1).

The remaining material was extruded onto wire also as described in procedure (1).

From a study of the following table it is seen that the blends of our invention provide improved shear strength

Table II

| Control | Example | Process | Composition (parts by weight) | | Blend | | Shear strength | Yield strength | Hardness | Dielectric constant |
|---|---|---|---|---|---|---|---|---|---|---|
| | | | "A" resin | "B" resin | Sp. gr. | M.I. | | | | |
| 1 | | 1 | 100 | 0 | 0.952 | 1.5 | 2,590 | 3,290 | | 2.31 |
| | 1 | 1 | 75 | 25 | 0.949 | 1.1 | 2,720 | 2,710 | | 2.28 |
| | 2 | 1 | 50 | 50 | 0.938 | 0.8 | 2,650 | 2,180 | | 2.28 |
| | 3 | 1 | 25 | 75 | 0.930 | 0.5 | 2,550 | 1,710 | | 2.27 |
| 2 | | 1 | 0 | 100 | 0.922 | 0.4 | 2,360 | 1,450 | | 2.26 |
| 3 | | 1 | 100 | 0 | 0.950 | 0.3 | 2,710 | | 56 | 2.31 |
| | 4 | 1 | 75 | 25 | 0.945 | 0.4 | 2,810 | | 55 | 2.29 |
| | 5 | 1 | 50 | 50 | 0.940 | 0.7 | 2,690 | | 52 | 2.28 |
| | 6 | 1 | 25 | 75 | 0.928 | 1.4 | 2,480 | | 47 | 2.26 |
| 4 | | 1 | 0 | 100 | 0.918 | 3.6 | 2,100 | | 42 | 2.26 | over the higher specific gravity component. Such improvement is unexpected and especially noteworthy in view of the effect produced on the yield strength and hardness by changing the blend composition. Both yield strength and hardness decrease with increasing concentration of lower specific gravity resin as would be expected. Shear strength surprisingly increases or remains substantially equivalent to that of the higher specific gravity component within the composition range of our invention (Examples 1, 2, 4 and 5). The dielectric constant is not substantially altered.

Examples 7, 8 and 9, giving test results for shear strength, hardness and resistance to thermal embrittlement, are summarized in Table III. Control compositions 5 and 6 again indicate the properties of the component resins of the blend. "A" resin is the higher specific gravity resin and "B" is the lower specific gravity resin.

Table III

| | Composition (parts by weight) | | | | |
|---|---|---|---|---|---|
| Control | 5 | | | | 6 |
| Example [1] | | 7 | 8 | 9 | |
| PROPERTIES | | | | | |
| Resin "A": | | | | | |
| Sp. gr.—0.952 | 100 | 75 | 50 | 25 | 0 |
| M.I.—1.5 | | | | | |
| Resin "B": | | | | | |
| Sp. gr.—0.918 | 0 | 25 | 50 | 75 | 100 |
| M.I.—1.6 | | | | | |
| Blend: | | | | | |
| Sp. gr. | | 0.949 | 0.936 | 0.928 | |
| M.I. | | 1.3 | 1.1 | 1.1 | |
| Shear strength | 2,590 | 2,750 | 2,650 | 2,430 | 2,270 |
| Hardness | 58 | 56 | 52 | 47 | 43 |
| Thermal embrittlement (weeks to initial failure) | 6 | 25 | 25 | 24 | 20 |

[1] Materials prepared by Process 1.

It can be seen from the above table that an increase in the concentration of the lower specific gravity resin reduces hardness according to expectation. Within the range of our invention, Examples 7 and 8, both shear strength and resistance to thermal embrittlement are significantly increased. Contrary to ordinary expectation the blend not only is unreduced in shear strength but actually exceeds the shear strength of the higher specific gravity resin. Again unexpectedly, the resistance to thermal embrittlement of the blend is superior to that of the lower specific gravity resin.

In Examples 10–14 the blend compositions were tested for shear strength or thermal embrittlement and the results tabulated in Table IV. Control compositions 7, 8, 9 and 10 are given to indicate individual properties of the blend components. "A" and "B" again are the higher and lower specific gravity resins respectively.

Nearly double the resistance to thermal embrittlement provided by "C" resin was obtained in Example 18. In both instances the improvement over the resistance to thermal embrittlement characteristics of the "A" resin was exceptional.

Shear strength too was improved in the compositions of our invention tested in Table V. Examples 15 and 18, which are preferred compositions, exhibit shear strength unexpectedly greater than either of the components.

Examples 19 through 22 illustrate the criticality of the specific gravity and melt index of the blend components. The data for the components are given in control compositions 14, 15 and 16. It will be noted that the specific gravity of both lower specific gravity resins, "B" and "C"

*Table IV*

| Control | Example | Process | Composition (parts by weight) | | Blend | | Shear strength | Thermal embrittlement (hrs. to 60% failure) |
|---|---|---|---|---|---|---|---|---|
| | | | "A" resin | "B" resin | Sp.gr. | M.I. | | |
| 7 | | 1 | 100 | 0 | 0.950 | 0.3 | 2,710 | |
| | 10 | 1 | 75 | 25 | 0.942 | 0.3 | 2,790 | |
| | 11 | 1 | 50 | 50 | 0.940 | 0.3 | 2,800 | |
| | 12 | 1 | 25 | 75 | 0.928 | 0.4 | 2,530 | |
| 8 | | 1 | 0 | 100 | 0.922 | 0.4 | 2,360 | |
| 9 | | 2 | 100 | 0 | 0.963 | 0.6 | | 100 |
| | 13 | 2 | 67 | 33 | 0.945 | 1.2 | | 3,300 |
| | 14 | 2 | 33 | 67 | 0.932 | 3.8 | | 1,500 |
| 10 | | 2 | 0 | 100 | 0.917 | 18.0 | | 1,000 |

The results of the tests given in the above table show that increased resistance to thermal embrittlement is provided by addition of major or minor amounts of the higher specific gravity resin, Examples 13 and 14. On the other hand shear strength of the resin blend is improved only when a major portion of the blend, Examples 10 and 11, is higher specific gravity resin.

Examples 15–18 were tested for both shear strength and resistance to thermal embrittlement. Test results are summarized in Table V. The control compositions 11, 12 and 13 indicate the properties of the blend components. "A" is the higher specific gravity resin. "B" and "C" are lower specific gravity resins.

are above the limits for this property of the lower specific gravity component of our blends, namely 0.925.

*Table V*

| Control | Example | Process | Composition (parts by weight) | | | Blend | | Shear strength | Thermal embrittlement (hrs. to 60% failure) |
|---|---|---|---|---|---|---|---|---|---|
| | | | Resin "A" | Resin "B" | Resin "C" | Sp. gr. | M.I. | | |
| 11 | | 2 | 100 | 0 | 0 | 0.963 | 0.6 | 3,120 | 100 |
| | 15 | 2 | 67 | 33 | 0 | 0.949 | 0.5 | 3,240 | 5,200 |
| | 16 | 2 | 33 | 67 | 0 | 0.935 | 0.4 | 2,980 | 4,200 |
| 12 | | 2 | 0 | 100 | 0 | 0.920 | 0.5 | 2,450 | 2,400 |
| 13 | | 2 | 0 | 0 | 100 | 0.921 | 1.9 | 2,250 | 2,300 |
| | 17 | 2 | 33 | 0 | 67 | 0.936 | 1.0 | 2,760 | 3,880 |
| | 18 | 2 | 67 | 0 | 33 | 0.950 | 0.7 | 3,250 | 4,200 |

No improvement in shear strength is provided and in only one instance, Example 21, was there an improvement in resistance to thermal embrittlement.

In each of the above examples the test methods used were as follows:

Specific gravity (sp. gr.) (23°/23° C.), ASTM D–792–50
Melt index (M.I.) (g./10 min. or dg./min.), ASTM D–1238–52T
Tensile strength (p.s.i.), ASTM D–412–51T
Ultimate elongation (percent), ASTM D–412–51T

*Table VI*

| Control | Example | Process | Composition (parts by weight) | | | Blend | | Shear strength | Thermal embrittlement (hrs. to 60% failure) |
|---|---|---|---|---|---|---|---|---|---|
| | | | Resin "A" | Resin "B" | Resin "C" | Sp. gr. | M.I. | | |
| 14 | | 2 | 100 | 0 | 0 | 0.963 | 0.6 | 3,120 | 100 |
| 15 | | 2 | 0 | 100 | 0 | 0.928 | 39.0 | 1,670 | |
| 16 | | 2 | 0 | 0 | 100 | 0.927 | 2.1 | 2,530 | 4,200 |
| | 19 | 2 | 67 | 30 | 0 | 0.952 | 2.0 | 2,570 | |
| | 20 | 2 | 33 | 67 | 0 | 0.940 | 8.0 | 2,170 | |
| | 21 | 2 | 67 | 0 | 33 | 0.952 | 1.2 | 2,770 | 470 |
| | 22 | 2 | 33 | 0 | 67 | 0.940 | 1.5 | 2,720 | 4,200 |

The test results summarized in the above table show the considerable improvement obtained in both resistance to thermal embrittlement and shear strength with the preferred compositions of our invention, Examples 15 and 18. The resistance to thermal embrittlement was increased to more than double that of the thermal-embrittlement-resistant resin "B" in one instance, Example 15.

Yield strength (p.s.i.), ASTM D–412–51T
Shear strength (p.s.i.), ASTM D–732–46
Hardness (durometer "D"), ASTM D–676–42T
Brittle temperature (° C.), ASTM D–746–55T[1]

---
[1] Modified to indicate temperature at which 80% of specimens tested passed, rather than 50% as suggested.

Dielectric constant (@ 50 mc.)—per "Suggested Liquid Displacement for Dielectric Constant" described in "ASTM Standards on Electrical Insulating Materials, With Related Information," September 1957, Appendix VI.

Thermal embrittlement resistance—per Underwriters' Laboratories, Inc. ("Standards for Flexible Cord and Fixture Wire," Sec. 92; 5 specimens were run at 70° C. for each test and the results averaged in the tables.

The polyethylene blends hereinabove described are highly suited for wire and cable insulation and jacketing and also for pipe and other extruded objects wherein a high degree of resistance to thermal embrittlement and shear strength are desirable. Also although most advantageous in extrusion processing these resin blends are equally suitable for articles which are calendered, injection or compression molded etc. Because the properties of the blends are fully comparable or superior in physical and electrical properties to presently known resin compositions of like melt index they are capable of being substituted therefor.

What is claimed is:

1. A composition possessing improved shear strength and resistance to thermal embrittlement comprising 50 to 85 parts by weight of a polyethylene resin having a specific gravity above 0.945 and a melt index between about 0.02 and 8.0 and 50 to 15 parts by weight of a polyethylene resin having a specific gravity between about 0.915 and 0.925 and a melt index between about 0.02 to 25.0.

2. A composition possessing improved shear strength and resistance to thermal embrittlement comprising 50 to 85 parts by weight of polyethylene resin having a specific gravity above 0.945 and a melt index between about 0.02 and 8.0 and 50 to 15 parts by weight of a polyethylene resin having a specific gravity between about 0.915 and 0.925 and a melt index between about 0.02 to 25.0 said composition having a specific gravity between about 0.930 and 0.960 and a melt index between about 0.02 and 5.0.

3. A composition possessing improved shear strength and resistance to thermal embrittlement comprising 60 to 85 parts by weight of a polyethylene resin having a specific gravity above 0.955 and a melt index between about 0.05 and 3.0 and 40 to 15 parts by weight of a polyethylene resin having a specific gravity between about 0.917 and 0.923 and a melt index between about 0.05 and 5.0.

4. The composition as claimed in claim 3, said composition having a specific gravity between about 0.940 and 0.958 and a melt index about 0.02 and 3.0.

5. A composition possessing improved shear strength and resistance to thermal embrittlement comprising 60 to 85 parts by weight of a polyethylene resin having a specific gravity above 0.955 and a melt index between about 0.05 and 3.0 and 40 to 15 parts by weight of a polyethylene resin having a specific gravity between 0.917 and 0.923 and a melt index between about 0.05 and 3.0, said composition having a specific gravity between about 0.940 and 0.958 and a melt index between about 0.1 and 1.5.

References Cited by the Examiner

UNITED STATES PATENTS

| 2,727,024 | 12/1955 | Field | 260—897 |
|---|---|---|---|
| 2,868,762 | 1/1959 | Oaks | 260—897 |
| 2,956,035 | 10/1960 | Mock | 260—897 |
| 2,983,704 | 5/1961 | Roedel | 260—897 |

FOREIGN PATENTS

| 201,195 | 2/1956 | Australia. |
|---|---|---|
| 790,115 | 2/1958 | Great Britain. |

OTHER REFERENCES

Renfrew: Polyethylene (1957), Iliffe and Sons, Ltd., London, page 205 relied on.

MURRAY TILLMAN, *Primary Examiner.*

L. H. GASTON, D. ARNOLD, L. J. BERCOVITZ, *Examiners.*